United States Patent
Yamada et al.

(10) Patent No.: US 6,854,477 B2
(45) Date of Patent: Feb. 15, 2005

(54) APPARATUS FOR INHIBITING FUELS FROM FLOWING OUT OF FUEL TANKS

(75) Inventors: Norihiro Yamada, Aichi-ken (JP); Eishin Mori, Aichi-ken (JP); Keisuke Yoshida, Aichi-ken (JP); Koji Miwa, Toyota (JP); Takashi Ishikawa, Okazaki (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/640,660

(22) Filed: Aug. 14, 2003

(65) Prior Publication Data

US 2004/0134532 A1 Jul. 15, 2004

(30) Foreign Application Priority Data

Aug. 23, 2002 (JP) ........................................ 2002-243593

(51) Int. Cl.⁷ .............................................. F16K 24/04
(52) U.S. Cl. ........................................ 137/202; 137/43
(58) Field of Search ................................... 137/43, 202

(56) References Cited

U.S. PATENT DOCUMENTS 6,564,821 B1 * 5/2003 Orenstein et al. ........... 137/202

2003/0098063 A1 * 5/2003 Mori et al. .................. 137/202

FOREIGN PATENT DOCUMENTS

| JP | A-8-105571 | 4/1996 |
| JP | A11-229984 | 8/1996 |

* cited by examiner

Primary Examiner—Gerald A. Michalsky
(74) Attorney, Agent, or Firm—Posz & Bethards, PLC

(57) ABSTRACT

An apparatus is for inhibiting fuels from flowing out of fuel tanks, and includes a housing having an evaporator opening, a floating valve, a seat, a cylinder having a peripheral wall and a lateral hole formed in the peripheral wall and communicating the inside of the cylinder with the outside, a bottom hole formed in the seat and communicating the inside of the cylinder with the outside, and a flow passage extending from the bottom hole to the lateral hole, flow passage in which a part of the peripheral wall of the cylinder intervenes. Alternatively, the apparatus include a flow passage extending from the bottom hole to the evaporator opening and constricted partially by the seat and a bottom of the floating valve. Thus, gases are less likely to float the floating valve upward, but liquids are likely to float it upward.

10 Claims, 5 Drawing Sheets

APPARATUS FOR INHIBITING FUELS FROM FLOWING OUT OF FUEL TANKS

BACKGROUND OF THE INVENTION

1. Field of the Invention

The present invention relates to structural improvements on cut-off valves and means for detecting whether fuel tanks are filled up with fuels, cut-off valves and means which are disposed on automobile fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon and the like, and are stored temporarily therein. Thus, the evaporator circuit inhibits the pressure increment within fuel tanks, pressure increment which results from the increment of vapor pressure. The canisters are connected with engines, and engines exert an inlet negative pressure to release the adsorbed vaporized fuels from activated carbon to mix them into an air-fuel mixture. Accordingly, the adsorbed vaporized fuels are used again as fuels.

The evaporator circuit is naturally provided with an opening, a so-called evaporator opening, which is formed in fuel tanks. The evaporator opening is generally formed at the uppermost portion of fuel tanks in order to inhibit liquid fuels from flowing into the evaporator circuit. However, when the level of liquid fuels move up and down, there might arise a fear that liquid fuels flow into the evaporator circuit through the evaporator opening. If liquid fuels flow even into the canister, they adsorb onto the activated carbon so that they might impair the usual vaporized fuel-adsorbing action of the activated carbon.

Hence, the, evaporator opening has been conventionally provided with a variety of cut-off valves. As for the cut-off valves, floating valves have been often used as described later. When the level of liquid fuels rises abnormally, the floating valves float upward by buoyancy to close the evaporator opening. Consequently, the floating valves inhibit liquid fuels from flowing into the evaporator circuit.

Moreover, fuel tanks are provided with means for detecting whether fuel tanks are filled up with fuels when fuels are supplied. As for the means for detecting filled-up fuel tanks, apparatuses comprising a floating valve have been often used as described later. The floating valve closes an opening of fuel tanks to heighten the pressure within fuel tanks. Thus, fuel supply guns are turned off automatically.

For example, Japanese Unexamined Patent Publication (KOKAI) No. 11-229,984 discloses an apparatus for inhibiting fuels from flowing out. The flow-out fuel inhibitor apparatus is provided with a shut-off valve and a cut-off valve. The shut-off valve lets a gas, which includes a fuel vapor generating in a large volume, flow to a canister when a fuel is supplied. The cut-off valve lets a gas, which includes a fuel vapor, flow to a canister when a fuel is not supplied. The flow-out fuel inhibitor apparatus produces an advantage that the number of component parts and the number of sealed portions can be reduced, because the shut-off valve, operating when a fuel is supplied, and the cut-off valve, operating when a fuel is not supplied, are accommodated in a housing.

However, the above-described flow-out fuel inhibitor apparatus requires two floating valves and two communication passages, respectively, which are disposed parallelly. Accordingly, there arises a problem that it is difficult to design so as to make each of them operate accurately. Moreover, the flow-out fuel inhibitor apparatus suffers from a drawback that the cost involved has gone up, because it requires two floating valves to result in increasing the number of component parts. In addition, the flow-out fuel inhibitor apparatus has a problem with a considerably limited disposition space, because it has an enlarged overall diameter.

Still further, when the above-described flow-out fuel inhibitor apparatus is applied to a variety of fuel tanks whose shape and capacity differ with each other, it is needed to manufacture a diversity of the flow-out fuel inhibitor apparatuses by varying the shapes of housing and float variously. Thus, there arises a drawback that the man-hour requirement for the manufacture has gone up enormously.

Hence, Japanese Unexamined Patent Publication (KOKAI) No. 8-105,571 discloses another apparatus for inhibiting fuels from flowing out. As illustrated in FIG. 8, the flow-out fuel inhibitor apparatus comprises a casing 100, a floating valve 200, a hole 101 with a larger opening area, and a hole 102 with a smaller opening area. The floating valve 200 is disposed in the casing 100. The hole 101 is formed in the bottom of the casing 100. The hole 102 is formed in the top of the casing 100.

The flow-out fuel inhibitor apparatus operates as hereinafter described. When a fuel is supplied, air within a fuel tank 300 is emitted in the following manner as the level of the liquid fuel rises. The air passes through the hole 101 having a larger opening area and hole 102 having a smaller opening area of the casing 100. Then, the air is emitted into a liquid reservoir 105 through an opening 104 by way of a gap 103, into an opened differential-pressure valve 106, into a gap 107, and into a pipe 108 which is connected to a canister and the like. Thereafter, when the hole 101 with a larger opening area is placed below the level of the liquid fuel, the air within the fuel tank 300 is emitted by way of the hole 102 with a smaller opening area alone. However, when the air is emitted through the hole 102 having a smaller opening area only, the air emission is decreased so less that the pressure increases within the fuel tank 300 to actuate a mechanism for turning off a fuel supply gun.

Subsequently, it is possible adjust the level of the liquid fuel to a filled-up liquid-level height "L2" by supplying the fuel with a slow rate which is reduced in accordance with the volume of the air emitted through the hole 102 having a smaller opening area. Moreover, when the level of the liquid fuel exceeds the filled-up liquid-level height "L2," it is possible to inhibit the fuel from entering the pipe 108 which is communicated with the opening 104, because the opening 104, through which the air within the fuel tank 300 is emitted when the fuel is supplied, is closed by the floating valve 200.

However, fuel vapors generate in a large volume when fuels are supplied initially. When fuel vapors resulting from the supplied fuel and the pressure increment resulting from the volume decrement of the vapor phase within fuel tank are combined, the vapor fuels flow through the evaporator opening at a rate of about 180 L/min. instantaneously. The wind velocity of the fuel vapors reach even 10 m/sec. locally. Accordingly, in the flow-out fuel inhibitor apparatus disclosed in Japanese Unexamined Patent Publication (KOKAI) No. 8-105,571, gases flow into the case 100 through the bottom-end opening 109 in a greater ventilation volume. Consequently, the floating valve 200 might float upward to close the opening 104. On the other hand, the floating valve 200 is required to be likely to be moved upward by liquid fuels so that it functions to close the opening 104. In order to make the trade-off phenomenon compatible, it is necessary to secure a greater ventilation volume when gases flow in the direction that they do not float the floating valve 200 upward. As a result, there arises a drawback that the case 100 has enlarged.

SUMMARY OF THE INVENTION

The present invention has been developed in view of such circumstances. It is therefore an object of the present to provide a flow-out fuel inhibitor apparatus whose floating valve is made less likely to float upward in gases and is made likely to float upward in liquids, and simultaneously which is inhibited from enlarging.

An apparatus according to the present invention is for inhibiting fuels from flowing out of fuel tanks, and can achieve the aforementioned object. The present flow-out fuel inhibitor apparatus comprises:

- a housing fixed to a top of a fuel tank, and having an evaporator opening communicating with a canister at a top thereof, a fuel opening enabling a liquid fuel held in the fuel tank to enter the housing at a bottom thereof, and a minor-diameter through hole disposed in the vicinity of a top inner surface of the fuel tank and communicating the inside of the housing with the outside;
- a floating valve accommodated in the housing, floating on a liquid fuel, and moving up and down in accordance with up-and-down movements of a level of the liquid fuel;
- a seat on which the floating valve is placed;
- a cylinder extending upward from the seat, accommodating the floating valve, and having a peripheral wall and a lateral hole formed in the peripheral wall and communicating the inside of the cylinder with the outside;
- a bottom hole formed in the seat, and communicating the inside of the cylinder with the outside; and
- a flow passage extending from the bottom hole to the lateral hole, flow passage in which a part of the peripheral wall of the cylinder intervenes,
- whereby detecting that the fuel tank is filled up with the liquid fuel by increasing a gas pressure within the fuel tank when the level of the liquid fuel within the fuel tank fully closes the fuel opening, and closing the evaporator opening by moving the floating valve upward when the level of the liquid fuel rises abnormally.

Moreover, it is desirable that the bottom hole can comprise an outer hole disposed outside an area which is demarcated by an image when the floating valve is projected vertically to the seat, and an inner hole disposed inside the area; the inner hole can communicate the inside of the cylinder with the outside; a flow passage can extend from the inner hole to the lateral hole, flow passage in which a part of the peripheral wall of the cylinder intervenes; and an opening area of the outer hole can be greater than an opening area of the inner hole by a factor of 2 or less. In this instance, the inner hole can further desirably be disposed lower and closer to the fuel opening than the outer hole is disposed. In addition, the floating valve can preferably have a receiving surface in a bottom surface thereof, receiving surface which faces the bottom hole.

In another aspect of the present invention, the present flow-out fuel inhibitor apparatus comprises:

- a housing fixed to a top of a fuel tank, and having an evaporator opening communicating with a canister at a top thereof, a fuel opening enabling a liquid fuel held in the fuel tank to enter the housing at a bottom thereof, and a minor-diameter through hole disposed in the vicinity of a top inner surface of the fuel tank and communicating the inside of the housing with the outside;
- a floating valve accommodated in the housing, floating on a liquid fuel, and moving up and down in accordance with up-and-down movements of a level of the liquid fuel;
- a seat on which the floating valve is placed;
- a bottom hole formed in the seat, and communicating the fuel opening with the housing; and
- a flow passage extending from the bottom hole to the evaporator opening, and constricted partially by the seat and a bottom of the floating valve,
- whereby detecting that the fuel tank is filled up with the liquid fuel by increasing a gas pressure within the fuel tank when the level of the liquid fuel within the fuel tank fully closes the fuel opening, and closing the evaporator opening by moving the floating valve upward when the level of the liquid fuel rises abnormally.

Moreover, it is desirable that the bottom hole can comprise an outer hole disposed outside an area which is demarcated by an image when the floating vale is projected vertically to the seat, and an inner hole disposed inside the area; the inner hole can communicate the fuel opening with the housing; a flow passage can extend from the inner hole to the evaporator opening, and can be constricted partially by the seat and a bottom of the floating valve; and an opening area of the outer hole can be greater than an opening area of the inner hole by a factor of 2 or less. In this instance, the inner hole can further desirably be disposed lower and closer to the fuel opening than the outer hole is disposed. In addition, the floating valve can preferably have a receiving surface in a bottom surface thereof, receiving surface which faces the bottom hole.

In accordance with the present flow-out fuel inhibitor apparatus, it is possible to inhibit gases from floating the floating valve upward when fuels are supplied initially. At the same time, the floating valve can float upward in liquid fuels with ease. As a result, the present flow-out fuel inhibitor apparatus is improved in terms of the response when the floating valve serves as a cut-off valve.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
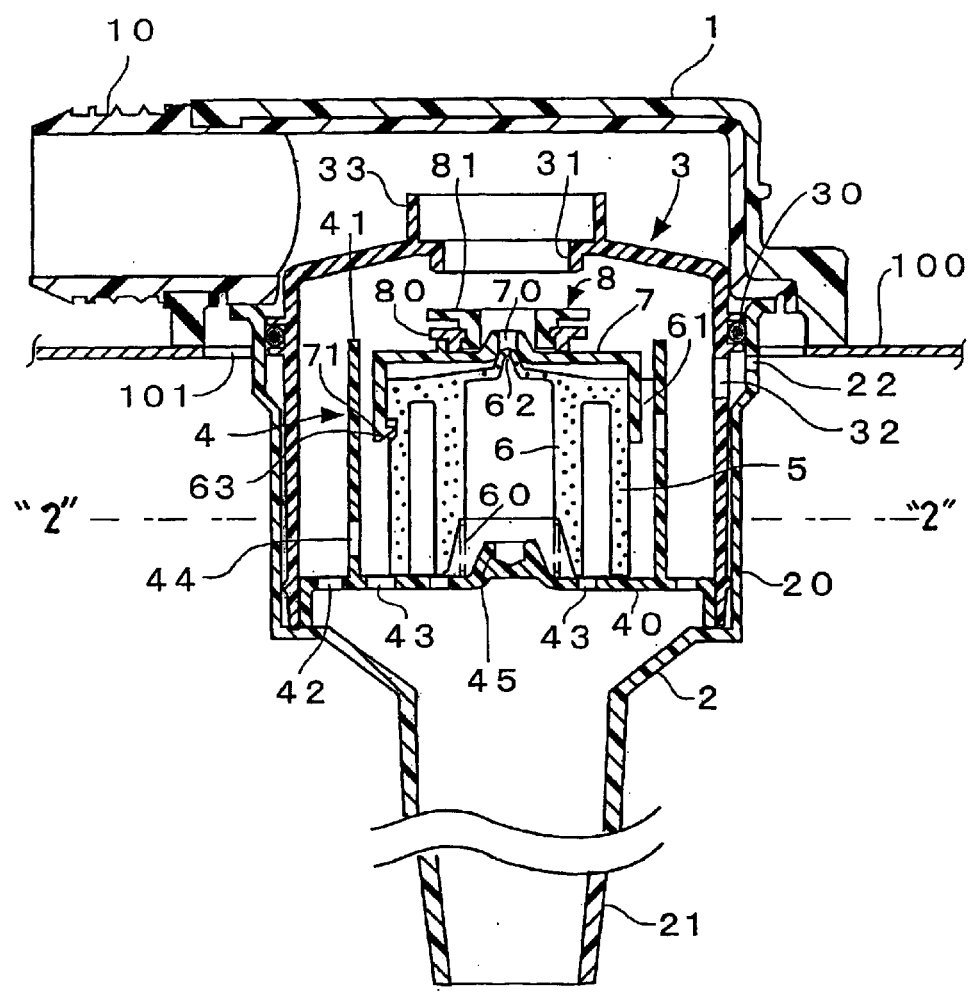
FIG. 1 is a cross-sectional view of a flow-out fuel inhibitor apparatus according to Example No. 1 of the present invention.

Having generally described the present invention, a further understanding can be obtained by reference to the specific preferred embodiments which are provided herein for the purpose of illustration only and not intended to limit the scope of the appended claims.

In accordance with the present flow-out fuel inhibitor apparatus, the floating valve is held within the housing by its own weight in the same manner as the conventional flow-out fuel inhibitor apparatus when the level of the liquid fuel is placed below the fuel opening under normal operating circumstances and fuel supply circumstances. Accordingly, the evaporator opening is opened. Therefore, the gas within the fuel tank passes the housing through the fuel opening of the housing, and flows into the canister through the evaporator opening. Thus, the gas pressure within the fuel tank can be adjusted.

After the level of the liquid fuel within the fuel tank rises to arrive at the opening position of the fuel opening under fuel supply circumstances, a large differential pressure arises between the vapor phase within the fuel tank and the vapor phase within the housing because the ventilation resistance is exerted greatly to the gas passing the minor-diameter through hole which is disposed in the housing. Accordingly, the level of the liquid fuel within the housing is placed higher than the level of the liquid fuel within the fuel tank. Thus, the floating valve ascends so that the valve seat closes the evaporator opening, thereby shutting off the ventilation of the vaporized gas. Consequently, the pressure within the fuel tank increases instantaneously so that the present flow-out fuel inhibitor apparatus can promote to automatically turn off fuel supply guns. Specifically, in accordance with the present flow-out fuel inhibitor apparatus, it is possible to detect whether the fuel tank is filled up with the liquid fuel by means of the fuel opening. As a result, it is possible to adjust the level of the liquid fuel which tells the position for detecting filled-up fuel tanks by simply adjusting the position of the fuel opening or adjusting the opening shape thereof.

On the other hand, when the level of the liquid fuel rises abnormally to float the floating valve upward upon accelerating or rolling over vehicle in driving, the floating valve closes the evaporator opening. Thus, the liquid fuel is inhibited from entering the evaporator opening and then flowing into the canister. Hence, the floating valve serves as a cut-off valve.

When liquid fuels are supplied initially and vapors generate in a larger volume, the vapors are ventilated through the fuel opening in a greater volume. If such is the case, the gases flowed into the fuel opening flow into the cylinder through the bottom hole formed in the seat, and flow out through the lateral hole formed in the peripheral wall of the cylinder. Then, the gases are emitted through evaporator opening. In this instance, note that the flow passage extending from the bottom hole to the lateral hole is deflected in the present flow-out fuel inhibitor apparatus, because a part of the peripheral wall intervenes the flow passage. However, the cross-sectional area of the flow passage determines the ventilation resistance to the gases and pressure loss thereof. Accordingly, when the bottom hole and the lateral hole have a large opening area securely, the deflected flow passage hardly results in the enlarged ventilation resistance to the gases and pressure loss thereof. Consequently, it is possible to float the floating valve by a smaller force.

On the other hand, an inertia force is applied to the liquid fuel flowed into the cylinder through the bottom hole. Note that the inertia force is dependent on the viscosity and mass of the liquid fuel. Accordingly, even when the liquid fuel is deflected by the flow passage, the liquid fuel can keep the kinetic vector before it is deflected. Consequently, the liquid fuel applies a force to the floating valve to move it upward. Therefore, it is possible to float the floating valve upward with good response when the floating valve serves as a cut-off valve.

In another aspect of the present invention, the present flow-out fuel inhibitor apparatus is free from the cylinder, but comprises a flow passage which extends from the bottom hole to the evaporator opening, and which is constricted partially by the seat and a bottom of the floating valve. The thus constricted flow passage does not exert a large resistance to gases, and does not cause gases to show a large pressure loss. Accordingly, a less force is required to float the floating valve upward. Moreover, when the liquid fuel passes the constricted flow passage, an inertia force is applied to the liquid fuel passing the constricted flow passage. Note that the inertia force is dependent on the viscosity and mass of the liquid fuel. Consequently, the liquid fuel applies a force to the floating valve to move it upward. Therefore, it is possible to float the floating valve upward with good response when the floating valve serves as a cut-off valve.

Thus, in accordance with the present flow-out fuel inhibitor apparatus, it is possible to securely inhibit the floating valve from floating upward to close the evaporator opening even when liquid fuels are supplied initially to generate vapors in a large volume. Moreover, it is possible to float the floating valve upward on liquid fuels with good response.

It is desirable that the bottom hole can comprise an outer hole disposed outside an area which is demarcated by an image when the floating vale is projected vertically to the seat, and an inner hole disposed inside the area; the inner hole can communicate the inside of the cylinder with the outside; a flow passage can extend from the inner hole to the lateral hole, flow passage in which a part of the peripheral wall of the cylinder intervenes; and an opening area of the outer hole can be greater than an opening area of the inner hole by a factor of 2 or less. Alternatively, it is desirable that the bottom hole can comprise an outer hole disposed outside an area which is demarcated by an image when the floating vale is projected vertically to the seat, and an inner hole disposed inside the area; the inner hole can communicate the fuel opening with the housing; a flow passage can extend from the inner hole to the evaporator opening, and can be constricted partially by the seat and a bottom of the floating valve; and an opening area of the outer hole can be greater than an opening area of the inner hole by a factor of 2 or less. With such arrangements, it is possible to reduce the diameter of the outer hole while inhibiting gases from floating the floating valve upward by the deflected flow passage which extends from the inner hole to the lateral hole and/or the evaporator opening. Therefore, it is possible to further upgrade the response of the floating valve when the floating valve serves as a cut-off valve. At the same time, it is possible to reduce the diameter of the housing as well so that the present flow-out fuel inhibitor apparatus can be furthermore downsized. It is preferred that the opening area of the outer hole can be greater than the opening area of the inner hole by a factor of from 1 to 3, further from 1.5 to 2.5, furthermore from 1.5 to 2.0.

In this instance, note that the inner hole can further desirably be disposed lower and closer to the fuel opening than the outer hole is disposed. With such an arrangement, the liquid fuel is likely to flow into the housing through the inner hole so that the rising level of the liquid fuel contacts with the floating valve quickly. As a result, it is possible to furthermore upgrade the response of the floating valve when the floating valve serves as a cut-off valve.

Moreover, the floating valve can preferably have a receiving surface in a bottom surface thereof, receiving surface which faces the bottom hole. The receiving surface enables the kinetic vector of the liquid fuel to act onto the floating valve more effectively. As a result, it is possible to moreover upgrade the response of the floating valve when the floating valve serves as a cut-off valve.

The lateral hole can desirably be disposed as low as possible in the cylinder. Thus, it is possible to further enlarge the ventilation volume of gases which do not contribute to moving the floating valve upward. The lateral hole can preferably be formed in the periphery of the cylinder in a quantity of 3 or more, further from 3 to 8, furthermore from 4 to 6.

The housing can be disposed integrally with the fuel tank, or can be disposed independently of the fuel tank. Further, the housing can be disposed within the fuel tank where the vapor phase of the fuel exists, or can be disposed so as to penetrate a top wall of the fuel tank. Furthermore, the method of fixing the housing to the fuel tank is not limited in particular, for example, the housing can be fastened to the fuel tank by means of welding or bolt, or the housing can be formed integrally with the fuel tank. The evaporator opening communicating with the canister is positioned at the uppermost portion of the housing in general. However, the position of the evaporator opening is not limited in particular, as far as the evaporator opening is placed where the floating valve can close the evaporator opening when the floating valve ascends by buoyancy.

The minor-diameter through hole formed in the housing communicates the inside of the fuel tank with the inside of the housing. It is important to appropriately design the diameter and quantity of the minor-diameter through hole. When the diameter of the minor-diameter through hole is too large, or when the quantity of the minor-diameter through holes is too much, it is difficult to increase the inner pressure within fuel tanks when fuel tanks are filled up with liquid fuels. Accordingly, it is difficult to automatically turn off fuel supply guns. Moreover, when the diameter of the minor-diameter through hole is too small, or when the quantity of the minor-diameter through holes is too less, it is difficult to distribute the gas within fuel tanks to the canister. Consequently, a drawback might arise to adversely affect when the floating valve serves as a cut-off valve to adjust the inner pressure within fuel tanks. Therefore, it is necessary to determine the diameter and quantity of the minor-diameter through holes by trial and error but precisely depending on the capacity of fuel tanks. For example, the diameter of the minor-diameter through hole can preferably be from 0.5 to 3.0 mm, further preferably from 1.0 to 2.0 mm. Note that it is desirable to dispose the minor-diameter through hole as close as possible to the top surface of fuel tanks in order to inhibit liquid fuels from entering the housing.

The fuel opening of the housing can be formed as a bottom-end opening of a cylinder which extends downward from the housing. If such is the case, the length of the cylinder can be designed so that the bottom-end opening is placed at the liquid level of the liquid fuel when the fuel tank is filled up with the liquid fuel. Therefore, depending on the capacity and shape of fuel tanks, the length of the cylinder varies diversely. However, it is possible to detect whether fuel tanks are filled up with liquid fuels by simply adjusting the length of the cylinder. For example, when the cylinder is formed to have a maximum length, it is possible to determine a position at which fuel tanks are filled up with liquid fuels by simply cutting the cylinder to a desired length according to the type of vehicles. Accordingly, it is not required to manufacture a variety of flow-out fuel inhibitor apparatuses according to fuel tanks. Consequently, it is possible to sharply reduce the cost involved in manufacturing fuel tanks. Moreover, when the cylinder and the housing are formed independently, it is suffice to prepare a plurality of the cylinders having a desired length alone.

The cylinder can be fastened to a bottom of the housing. Alternatively, a top end of the cylinder can be shared by a peripheral wall of the housing. The cylinder can desirably have a smaller diameter at the bottom-end opening at least than the diameter of the housing. With such an arrangement, it is possible to accurately detect whether the fuel tank is filled up with the liquid fuel when the level of the liquid fuel waves in supplying the liquid fuel.

It is preferred that the floating valve can be a double-floating valve accommodated in the housing and comprising a lower float, an upper float, and a ring-shaped valve seat. The lower float floats on the liquid fuel and moves up and down in accordance with up-and-down movements of the level of the liquid fuel. The upper float is held on a top surface of the lower float so as to be movable up and down relatively with respect to the lower float, and has a minor-diameter valve hole opened or closed by the lower float. The valve seat is held to a top surface of the upper float, and opens or closes the evaporator opening by the up-and-down movements of the upper float accompanied by the up-and-down movements of the lower float. With such a double-floating valve, it is possible to further improve the response of the floating valve when the floating valve serves as a cut-off valve.

Specifically, when the level of the liquid fuel moves up and down violently upon accelerating or rolling over vehicle in driving, the valve seat keeps closing the evaporator opening for a certain period of time even after the lower float descends because the upper float has a small mass. In this instance, the valve hole is opened. Accordingly, it is possible for gases within the fuel tank to flow toward the canister through the evaporator opening by way of the valve hole. However, the liquid fuel is inhibited from passing the valve hole because the valve hole has a minor diameter. Consequently, it is possible to inhibit the liquid fuel from flowing into the canister.

The lower float can be made from the same materials as conventional floating valves are made from, and can be formed as the same shapes as they are formed. Moreover, the double-floating valve can float upward by the difference between its specific gravity and the gravity of liquid fuels alone. Alternatively, the double-floating valve can use the urging force of urging means, such as springs, as an aid for the buoyancy.

The upper float is held to the lower float so as to be movable up and down relatively with respect to the lower float. The upper float is required to have an engagement portion which engages with the lower float so that it descends together with the lower float when the lower float descends. Moreover, the valve hole of the upper float is formed so that it can be closed by the lower float in a liquid proof manner. The diameter of the valve hole can desirably be $\phi$ 3 mm or less, and can further desirably fall in a range of from $\phi$ 1 to 3mm, furthermore desirably from $\phi$ 1.5 to 2.5 mm. When the diameter of the valve hole exceeds $\phi$ 3 mm, it is not preferable because the liquid fuel is likely to flow into the evaporator opening through the valve hole.

The valve seat can seal the evaporator opening in a liquid proof manner, and is held to a top surface of the upper float. The valve seat can be disposed independently of the upper float. Alternatively, a part of the upper float can be formed as the valve seat.

EXAMPLES

The present invention will be hereinafter described in more detail with reference to specific embodiments.

Example No. 1

FIG. 1 illustrates a cross-sectional view of a flow-out fuel inhibitor apparatus according to Example No. 1 of the present invention. The flow-out fuel inhibitor apparatus comprises a cover 1, a cylinder-shaped body 2, an upper case 3, a lower case 4, and a double-floating valve 5. The cover 1 is fixed to the top of an opening 101 by welding. The opening 101 is formed in the top surface of an automobile gasoline tank 100 made from resin. The cylinder-shaped body 2 is fixed to the bottom surface of the cover 1 by welding. The upper case 3 is held by engagement in the cylinder-shaped body 2. The lower case 4 is held in the upper case 3. The double-floating valve 5 is disposed movably in the vertical direction in the upper case 3 and lower case 4.

The cover 1 is formed of polyethylene resin and polyamide resin by 2-color injection molding. The outside resinous layer is fixed by welding to the surface of the gasoline tank 100. The cover 1 is provided with a nipple 10. The nipple 10 protrudes parallel to the top surface of the gasoline tank 100, and is fitted into a tube which is connected with a canister.

The cylinder-shaped body 2 is formed of polyamide resin by injection molding, and is molded as a 2-stage construction. The 2-stage construction comprises a major-diameter portion 20, and a minor-diameter portion 21. Note that the end surface of the major-diameter portion 20 is fixed to the bottom surface of the cover 1 by welding to make a housing. The minor-diameter portion 21 extends substantially vertically into the gasoline tank 100. Note that the minor-diameter portion 21 has such a length that the bottom-end opening (i.e., a fuel opening) is placed at the liquid level of a liquid fuel when the fuel tank 100 is filled up with the liquid fuel. Moreover, in the side wall of the major-diameter portion 20, minor-diameter through holes 22 are formed at equal intervals. Thus, the inside of the cylinder-shaped body 2 is communicated with the vapor phase within the gasoline tank 100 by the minor-diameter through holes 22.

The upper case 3 and the lower case 4 are held in the major-diameter portion 20 of the cylinder-shaped body 2. The upper case 3 is formed as an inverted mug shape. The lower case 4 is fixed by engagement to the bottom-end opening of the upper case 3. The upper case 3 contacts with the shoulder of the cylinder-shaped body 2 at the bottom end, and also contacts with the major-diameter portion 20 of the cylinder-shaped body 2 at the outer peripheral surface by way of an O-ring 30 in an air proof manner. Thus, the upper case 3 is held in and fixed to the cylinder-shaped body 2. Further, an evaporator opening 31 communicating with the cover 1 is formed in the uppermost portion of the upper case 3. Furthermore, communication holes 32 communicating the inside of the upper case 3 with the outside are formed in the peripheral wall of the upper case 3 at positions under the O-ring 30 disposed around the outer peripheral surface of the upper case 3 and facing the minor-diameter through holes 22. Moreover, a cylinder-shaped liquid reservoir 33 is formed on the top surface of the upper case 3 around the evaporator opening 31, and is built upward in an upright position.

Figure 2:
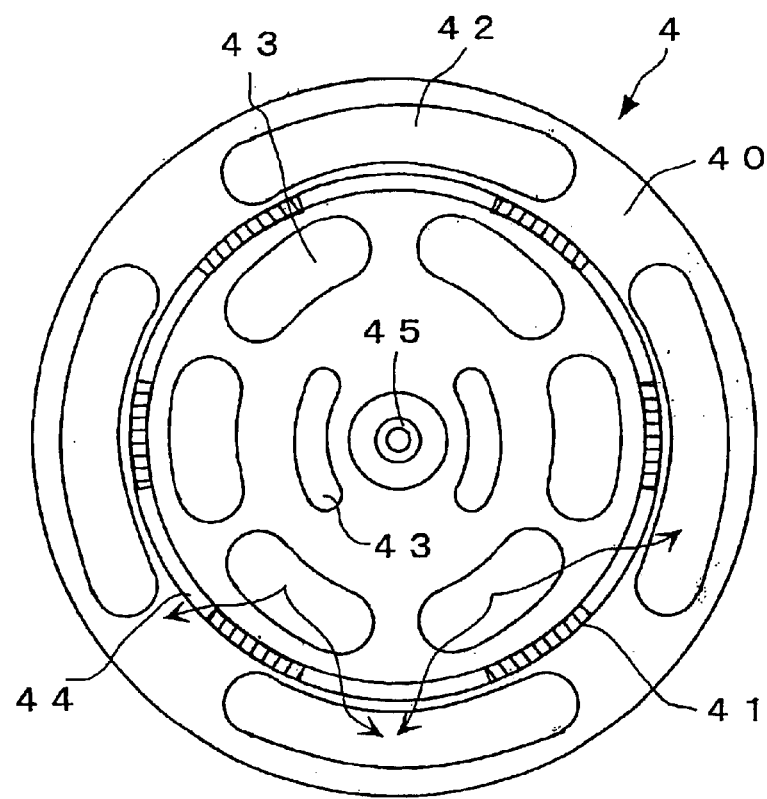
FIG. 2 is a plan view of a lower case of the flow-out fuel inhibitor apparatus according to Example No. 1 taken along the line "2"—"2" of FIG. 1.
Figure 3:
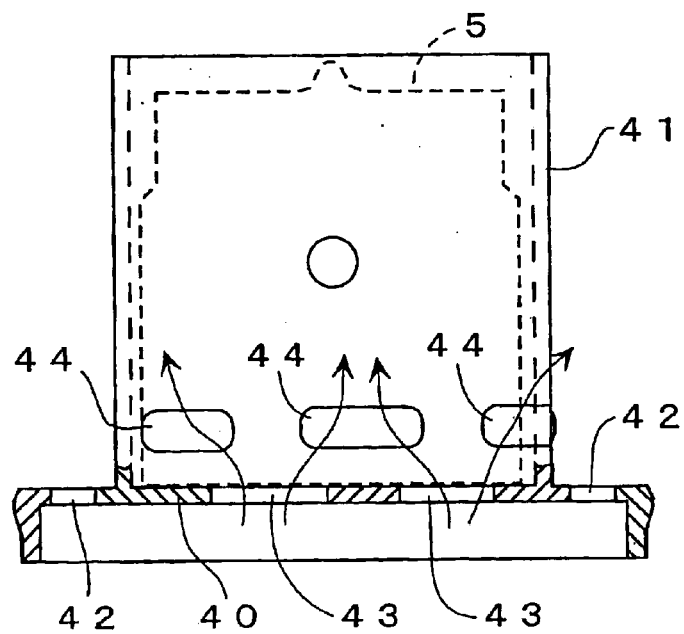
FIG. 3 is a side view of the lower case of the flow-out fuel inhibitor apparatus according to Example No. 1 shown partially in cross-section.

The lower case 4 includes a seat 40, and a cylinder 41. The seat 40 is fixed by engagement in the bottom-end opening of the upper case 3. The cylinder 41 projects upward from the seat 40. As illustrated in FIGS. 2 and 3, four outer holes 42 and eight inner holes 43 are formed in the seat 40. The outer holes 42 are disposed outside with respect to the cylinder 41, and pierce the top and bottom surfaces of the seat 40. The inner holes 43 are disposed inside with respect to the cylinder 41, and pierce the top and bottom surfaces of the seat 40. Moreover, as illustrated in FIG. 3, six lateral holes 44 are formed in the lower peripheral wall of the cylinder 41. The lateral holes 44 communicate the inside of the cylinder 41 with the outside. In addition, a protrusion 45 is formed in the center of the seat 40 to protrude upward therefrom.

As illustrated in FIG. 2, the six inner holes 43 of the eight inner holes 43 are disposed at predetermined intervals like a ring in the vicinity of the peripheral wall of the cylinder 41. Moreover, as illustrated in FIG. 3, the six inner holes 43 are disposed between the neighboring two lateral holes 44 and under them at the bottom of the peripheral wall of the cylinder 41. In addition, as illustrated in FIG. 2, a part of the peripheral wall of the cylinder 41 intervenes flow passages in which fluids enter the cylinder 41 through the inner holes 43 from below and flow out of the cylinder 41 through the lateral holes 44.

In the cylinder 41, the double-floating valve 5 is accommodated so that it is placed on the seat 40. The double-floating valve 5 comprises a lower float 6, an upper float 7, and a valve seat 8. The lower float 6 is accommodated in the cylinder 41 by way of a spring 60 which is held to the protrusion 45 at one of the opposite ends. On the outer peripheral surface of the lower float 6, a plurality of ribs 61 extending in the vertical direction are formed. Accordingly, the lower float 6 can move in the vertical direction within the cylinder 41 while the ribs 61 are brought into contact with and guided on the inner peripheral surface of the cylinder 41. Moreover, at the top of the lower float 6, a sealing protrusion 62 is formed. In addition, around the top of the lower float 6, the upper float 7 is held relatively movably in the vertical direction. The upper float 7 is formed as a cylinder shape bottomed at the top or an inverted cup shape. In the middle of the upper float 7, a through valve hole 70 is formed to face the sealing protrusion 62.

The upper float 7 is disposed so as to face the bottom end upward, and is held to the lower float 6. On the outer peripheral surface of the upper float 7, a plurality of engagement grooves 63 are formed, and engage with claws 71 which are formed on the opening end of the upper float 7. The engagement grooves 63 are formed vertically longer than the claws 71. Accordingly, the upper float 7 can move slightly relatively in the vertical direction with respect to the lower float 6. When the lower float 6 and upper float 7 move relatively in the direction approaching to each other, the sealing protrusion 62 of the lower float 6 closes the valve hole 70 to seal the valve hole 70.

The lower float 6 and upper float 7 are formed of polyoxymethylene (POM) resin. The shapes and apparent specific gravities of the lower float 6 and upper float 7 are designed so that their apparent specific gravities are smaller than that of gasoline in order that the lower float 6 and upper float 7 can float on liquid gasoline by the urging force of the spring 60. The spring 60 is held between the bottom end of the lower float 6 and the seat 40 of the lower case 4 in such a state that the spring 60 accumulates the urging force. However, the urging force is smaller than the sum of the weights of the lower float 6, upper float 7 and valve seat 8. Accordingly, in air and gasoline vapor, the lower float 6 presses the spring 60 by its own weight so that the bottom-end surface of the lower float 6 contacts with the seat 40 of the lower case 4.

The valve seat 8 includes a ring-shaped base 80, and a valve body 81. On the top surface of the upper float 7, the base 80 is fixed by welding. The base 80 is fixed by engagement to the valve body 81 made from rubber. When the upper float 7 ascends as the lower float 6 ascends, the valve body 81 contacts with the bottom-end surface of the evaporator opening 31 to seal the evaporator opening 31.

In the thus constructed flow-out fuel inhibitor apparatus according to Example No. 1, the total weight of the double-floating valve 5, i.e., the summed weight of the lower float 6, upper float 7 and valve seat 8, overcomes the urging force of the spring 60 when the level of the liquid gasoline is below the lower float 6 under steady ordinary circumstances. Accordingly, a clearance is formed between the valve body 81 and the bottom-end surface of the evaporator opening 31. Therefore, the gas within the gasoline tank 100 passes the outer holes 42 and inner holes 43 through the through holes 22 or the bottom-end opening of the cylinder-shaped body 2 to enter the upper case 3. Then, the gas passes the nipple 20 through the evaporator opening 31, and flows into the canister. Thus, it is possible to inhibit the gas pressure within the gasoline tank 100 from heightening.

Meanwhile, when the gasoline is supplied initially, gasoline vapor generates in a large volume so that it passes the inner holes 43 at a considerably large flow rate. However, the gasoline vapor is emitted through the evaporator opening 31 by way of the inner holes 43 and lateral holes 44 as designated with the arrows of FIGS. 2 and 3, because the inner holes 43 and lateral hole 44 have a sufficient opening area. Although the flow passages are deflected as described above, the deflection does not result in exerting a large resistance to the gasoline vapor or causing the gasoline vapor to show a large pressure loss when a sufficient opening area is secured for the inner holes 43 and lateral holes 44, because the ventilation resistance to the gasoline vapor and the pressure loss thereof are determined by the cross-sectional area of the flow passages. As a result, it is possible to inhibit the drawback that the gasoline vapor floats the double-floating valve 5 upward.

On the other hand, when vehicles travel on roads with large irregularities, or when they travel on curved roads, the level of the liquid gasoline waves greatly. Accordingly, even if the level of the liquid gasoline is placed below positions at which the double-floating valve 5 floats under steady circumstances, the liquid gasoline might enter the cylinder-shaped body 2 through the bottom-end opening of the cylinder-shaped body 2 or the minor-diameter through holes 22. However, in the flow-out fuel inhibitor apparatus according to Example No. 1, the liquid gasoline having passed the inner holes 43 collides with the peripheral wall of the cylinder 41 which is disposed between the neighboring lateral holes 43 so that an inertia force is applied to the liquid gasoline depending on the viscosity and mass. Consequently, even when the flow passages are deflected, the liquid gasoline can keep the kinetic vector before it is deflected. As a result, the liquid gasoline applies a force to the double-floating valve 5 for floating it upward. Thus, the liquid gasoline floats the lower float 6 and upper float 7 upward so that the valve body 81 closes the evaporator opening 31. Therefore, the flow-out fuel inhibitor apparatus according to Example No. 1 is good in terms of the response when it acts as a cut-off valve.

Moreover, even if the valve body 81 adheres to the evaporator opening 31, the lower float 6 descends so that the upper float 7 detaches from the lower float 6 to separate the sealing protrusion 62 from the valve hole 70 when the level of the liquid gasoline descends. Accordingly, the pressure within the cylinder-shaped body 2 is equalized with the pressure on the side of the nipple 20 communicating with the canister. Consequently, the valve body 81 separates from the evaporator opening 31 with ease. As a result, the flow-out fuel inhibitor apparatus according to Example No. 1 is highly responsive when the level of the liquid gasoline waves greatly, and is good in terms of the dynamic sealing property.

In addition, in supplying the gasoline, when the level of the liquid gasoline reaches the end surface of the bottom-end opening of the cylinder-shaped body 2, the gas existing in the vapor phase within the gasoline tank 100 flows into the cylinder-shaped body 2 through the through holes 22 alone. Note that the through holes 22 are formed to have such a minor diameter that they exhibit a large ventilation resistance inherently. Therefore, a differential pressure arises between the vapor phase within the gasoline tank 100 and the vapor phase within the cylinder-shaped body 2 to ascend the level of the liquid gasoline within the cylinder-shaped body 2. Accordingly, the double-floating valve 5 floats upward so that the valve body 81 closes the evaporator opening 31 to shut off the ventilation. Consequently, the pressure within the gasoline tank 100 heightens at once. As a result, the gasoline tank 100 is detected that it is filled up with the gasoline. Thus, it is possible to promote to automatically turn off fuel supply guns.

The flow-out fuel inhibitor apparatus according to Example No. 1 is manufactured in the following manner, for instance. The double-floating valve 5 is first assembled. The assembled double-floating valve 5 is accommodated in the cylinder 41 of the lower case 4. Then, the upper case 3 and lower case 4 are fastened by engagement, and are fastened to the major-diameter portion 20 of the cylinder-shaped body 2 by way of the O-ring 30 by engagement. Thereafter, the opening end of the major-diameter portion 20 is fastened to the cover 1 by welding. The resulting module is fitted into the opening 101 of the gasoline tank 100. Finally, the cover 1 is welded to the periphery of the opening 101 of the gasoline tank 100.

Therefore, even when the gasoline tank 100 is formed as a variety of shapes or is formed to have a variety of capacities, it is possible to adjust the detecting position at which the gasoline tank 100 is detected to be filled up with gasoline by simply adjusting the length of the cylinder-shaped body 2. Moreover, a variety of gasoline tanks can share the component parts of the flow-out fuel inhibitor apparatus according to Example No. 1 except the cylinder-shaped body 2. Accordingly, it is possible to remarkably reduce the cost involved in manufacturing gasoline tanks. In addition, the flow-out fuel inhibitor apparatus requires a less boarding space and offers a high degree of freedom when it is disposed in vehicles, because it can be fastened by welding to a portion of the gasoline tank 100 with an extremely small area.

Example No. 2

Figure 4:
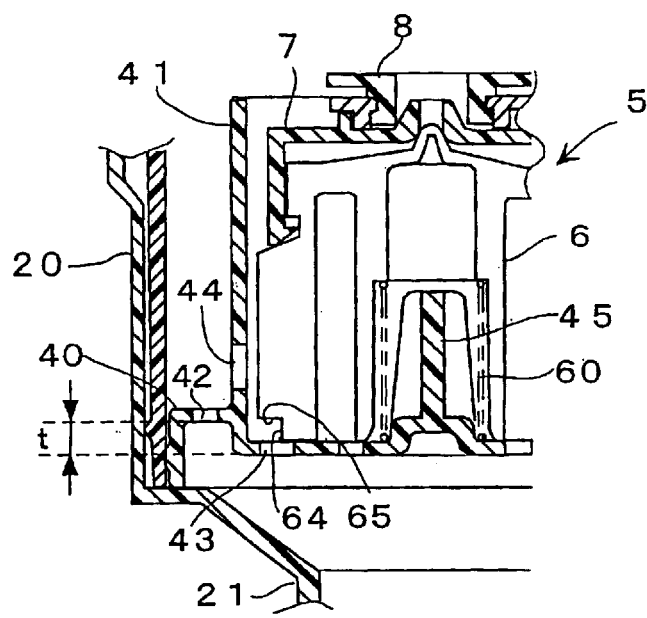
FIG. 4 is a major cross-sectional view of a flow-out fuel inhibitor apparatus according to Example No. 2 of the present invention.
Figure 5:
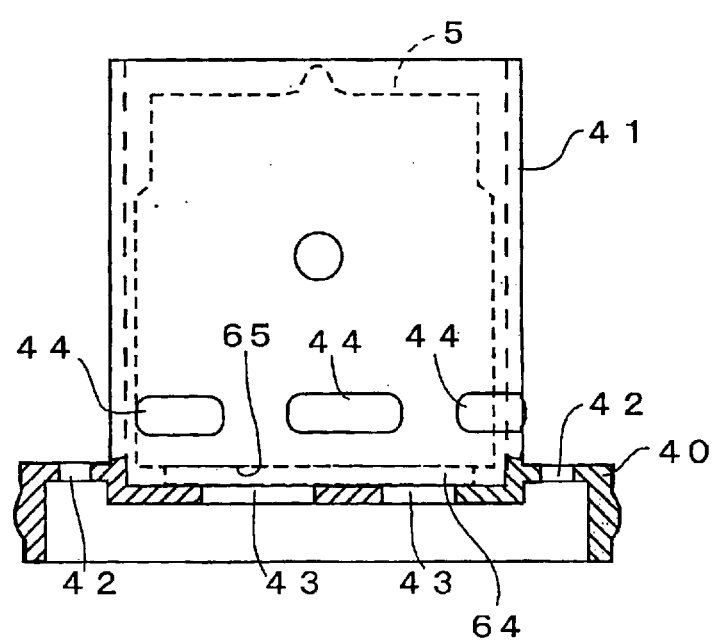
FIG. 5 is a side view of a lower case of the flow-out fuel inhibitor apparatus according to Example No. 2 shown partially in cross-section.

FIGS. 4 and 5 illustrate a major portion of a flow-out fuel inhibitor apparatus according to Example No. 2 of the present invention, respectively. Except that the lower case 4 is formed as a different shape from that of Example No. 1 and the lower float 6 is formed as a different shape from that of Example No. 1 partially, the flow-out fuel inhibitor apparatus according to Example No. 2 is arranged substantially identically with Example No. 1.

As illustrated in FIG. 4, a shoulder "t" is formed between the inner periphery and the outer periphery in the seat 40 of the lower case 4. Accordingly, the inner periphery of the seat 40 making the bottom of the cylinder 41 is disposed lower than the inner periphery of the seat 40 in Example No. 1. Moreover, as illustrated in FIG. 4, cut-offs 64 having a letter "L"-shaped cross-section are formed on the bottom-end surface of the lower float 6. Note that the cut-offs 64 are disposed so as to face the six inner holes 43 which are formed at positions adjacent to the peripheral wall of the cylinder 41.

In the flow-out fuel inhibitor apparatus according to Example No. 2, the inner holes 43 are close to the liquid level of the liquid gasoline, because they are disposed adjacent to the bottom-end opening of the cylinder-shaped body 2. Accordingly, compared with Example No. 1, the liquid gasoline is more likely to enter the inner holes 43 than it enters the outer holes 42. Moreover, the cut-offs 64 are formed so as to face the inner holes 43. Consequently, the liquid gasoline collides with a receiving surface 65 of the cut-offs 64 facing the inner holes 43. The kinetic vector of the colliding liquid gasoline acts so as to float the double-floating valve 5 upward. Moreover, the liquid gasoline which does not collide with the receiving surfaces 65 collides instead with the peripheral wall of the cylinder 41 between the neighboring lateral holes 44. As a result, an inertia force is exerted to the liquid gasoline depending on the viscosity and mass of the liquid gasoline. Thus, even when the liquid gasoline is deflected by the constricted flow passages, it can keep the kinetic vector before it is deflected. Due to these actions, the double-floating valve 5 is more likely to float upward than that of Example No. 1. Hence, the flow-out fuel inhibitor apparatus according to Example No. 2 is more upgraded in terms of the response when it serves as a cut-off valve.

In addition, even when gases flow into the cylinder 41 through the inner holes 43 in a large volume in supplying fuels initially, the gases readily leak from the inner holes 43 to the lateral holes 44. Therefore, it is possible to inhibit the drawback that the double-floating valve 5 floats upward under the circumstance.

Example No. 3

Figure 6:
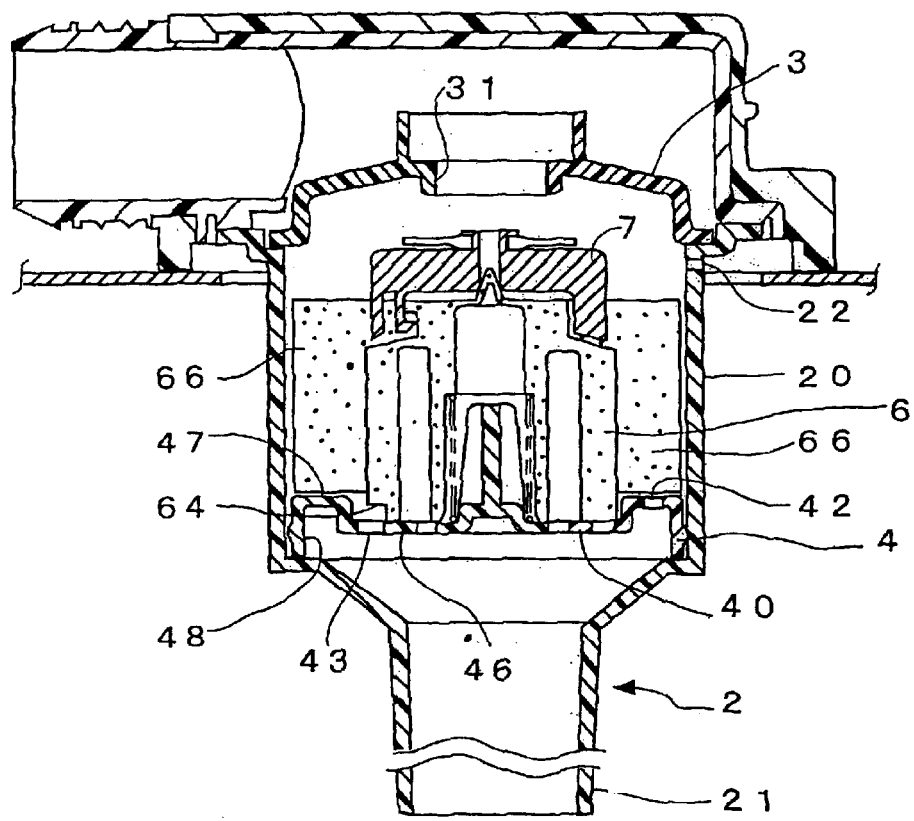
FIG. 6 is a cross-sectional view of a flow-out fuel inhibitor apparatus according to Example No. 3 of the present invention.
Figure 7:
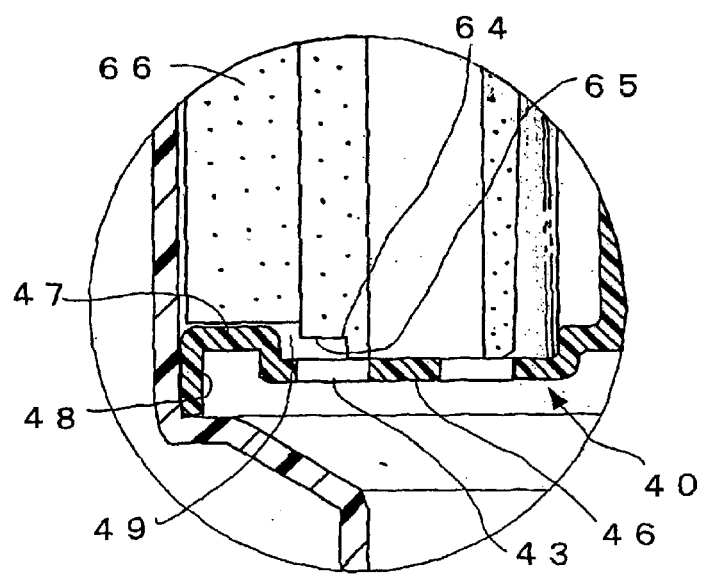
FIG. 7 is a major cross-sectional view of the flow-out fuel inhibitor apparatus according to Example No. 3.
Figure 8:
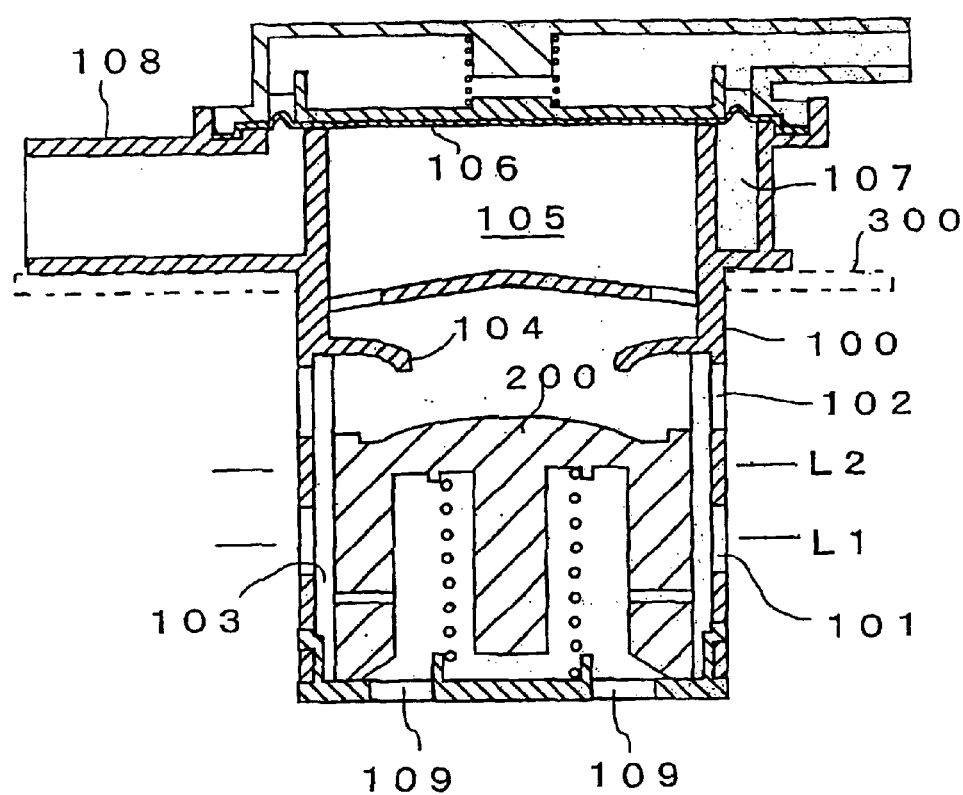
FIG. 8 is a cross-sectional view of a conventional flow-out fuel inhibitor apparatus.

FIG. 6 illustrates a cross-section of a flow-out fuel inhibitor apparatus according to Example No. 3 of the present invention. FIG. 7 illustrates an enlarged major portion of the flow-out fuel inhibitor apparatus. In the flow-out fuel inhibitor apparatus, the lower case 4 is free from the cylinder 41, and is made of the seat 40 alone. The seat 40 is fixed to the major-diameter portion 20 of the cylinder 2 by engagement. Moreover, the lower float 6 of the double-floating valve 5 is provided with a plurality of fins 66 which extend vertically on the outer periphery of the lower float 6. Accordingly, the lower float 6 can move up and down in the major-diameter portion 20 while the fins 66 are guided on the inner peripheral surface of the major-diameter portion 20. In addition, the upper case 3 is fixed by welding to the shoulder of the cylinder-shaped body 2 at the bottom end. Consequently, the air-tightness is secured between the upper case 3 and the cylinder-shaped body 2 without employing the O-ring 30. Except these arrangements, the flow-out fuel inhibitor apparatus according to Example No. 3 is arranged substantially identically with Example No. 1.

The seat 40 includes a disk-shaped center 46, a ring-shaped shoulder 47, and a cylinder 48. The shoulder 47 is disposed on the outer periphery of the center 46, and is higher than the center 46 by a predetermined height. The cylinder 48 is formed by bending the outer-peripheral end of the shoulder 47 vertically downward, and is fixed by engagement to the major-diameter portion 20 of the cylinder-shaped body 2. In the center 46, a plurality of the inner holes 43 are formed in the same manner as Example No. 1. In the shoulder 47, a plurality of the outer holes 42 are formed in the same manner as Example No. 1. Moreover, cut-offs 64 having a letter "L"-shaped cross-section are formed on the bottom-end surface of the lower float 6. Note that the cut-offs 64 are disposed so as to face the six inner holes 43, which are formed at positions adjacent to the shoulder 47, respectively. A vertical surface of the cut-offs 64 faces the vertical wall of the shoulder 47 horizontally or in the radial direction.

Thus, the passages for fluids flowing into the inner holes 43 from below are constricted by the seat 40, the cut-offs 64 and the vertical wall of the shoulder 47. Specifically, as illustrated in FIG. 7, constricted passages 49 are formed which are constricted at the seat 40, the cut-offs 64 and the vertical wall of the shoulder 47.

In the flow-out fuel inhibitor apparatus according to Example No. 3, the inner holes 43 are close to the liquid level of the liquid gasoline, because they are disposed adjacent to the bottom-end opening of the cylinder-shaped body 2. Accordingly, compared with Example No. 1, the liquid gasoline is more likely to enter the inner holes 43 than it enters the outer holes 42. Moreover, the liquid gasoline entering the inner holes 43 from below collides with a horizontal receiving surface 65 of the cut-offs 64 facing the inner holes 43. Consequently, the kinetic vector of the colliding liquid gasoline acts so as to float the double-floating valve 5 upward. In addition, the liquid gasoline entering the inner holes 43 from below is constricted by the constricted passages 49. As a result, a vector heading the peripheral direction of the shoulder 47 arises in the liquid gasoline, and the liquid gasoline with the vector flows the constricted passages 49. Therefore, an inertia force is exerted to the liquid gasoline depending on the viscosity and mass of the liquid gasoline. Thus, the floating valve 5 is more likely to float upward than that of Example No. 1. Hence, the flow-out fuel inhibitor apparatus according to Example No. 3 is more upgraded in terms of the response when it serves as a cut-off valve.

In addition, even when gases come in through the inner holes 43 in a large volume in supplying fuels initially, the gases can flow in the 360-degree direction or every radial direction after they pass the constricted passage 49. Accordingly, the gases are subjected to less resistance. Consequently, the gases readily leak from the inner holes 43 to the evaporator opening 31 by way of the constricted passages 49. As a result, it is possible to inhibit the drawback that the gases float the double-floating valve 5 upward under the circumstance.

Having now fully described the present invention, it will be apparent to one of ordinary skill in the art that many changes and modifications can be made thereto without departing from the spirit or scope of the present invention as set forth herein including the appended claims.

What is claimed is:

1. An apparatus for inhibiting fuels from flowing out of fuel tanks, the apparatus comprising:
   a housing fixed to a top of a fuel tank, and having an evaporator opening communicating with a canister at a top thereof, a fuel opening enabling a liquid fuel held in the fuel tank to enter the housing at a bottom thereof, and a minor-diameter through hole disposed in the vicinity of a top inner surface of the fuel tank and communicating the inside of the housing with the outside;
   a floating valve accommodated in the housing, floating on a liquid fuel, and moving up and down in accordance with up-and-down movements of a level of the liquid fuel;
   a seat on which the floating valve is placed;
   a cylinder extending upward from the seat, accommodating the floating valve, and having a peripheral wall and a lateral hole formed in the peripheral wall and communicating the inside of the cylinder with the outside;
   a bottom hole formed in the seat, and communicating the inside of the cylinder with the outside; and
   a flow passage extending from the bottom hole to the lateral hole, flow passage in which a part of the peripheral wall of the cylinder intervenes,
   whereby detecting that the fuel tank is filled up with the liquid fuel by increasing a gas pressure within the fuel tank when the level of the liquid fuel within the fuel tank fully closes the fuel opening, and closing the evaporator opening by moving the floating valve upward when the level of the liquid fuel rises abnormally.

2. The apparatus set forth in claim 1, wherein the bottom hole comprises an outer hole disposed outside an area which is demarcated by an image when the floating valve is projected vertically to the seat, and an inner hole disposed inside the area; the inner hole communicates the inside of the cylinder with the outside; a flow passage extends from the inner hole to the lateral hole, flow passage in which a part of the peripheral wall of the cylinder intervenes; and an opening area of the outer hole is greater than an opening area of the inner hole by a factor of 2 or less.

3. The apparatus set forth in claim 2, wherein the inner hole is disposed lower and closer to the fuel opening than the outer hole is disposed.

4. The apparatus set forth in claim 1, wherein the floating valve has a receiving surface in a bottom surface thereof, receiving surface which faces the bottom hole.

5. The apparatus set forth in claim 1, wherein the housing further has a cylinder which extends downward and whose bottom-end opening forms the fuel opening.

6. An apparatus for inhibiting fuels from flowing out of fuel tanks, the apparatus comprising:
   a housing fixed to a top of a fuel tank, and having an evaporator opening communicating with a canister at a top thereof, a fuel opening enabling a liquid fuel held in the fuel tank to enter the housing at a bottom thereof, and a minor-diameter through hole disposed in the vicinity of a top inner surface of the fuel tank and communicating the inside of the housing with the outside;
   a floating valve accommodated in the housing, floating on a liquid fuel, and moving up and down in accordance with up-and-down movements of a level of the liquid fuel;
   a seat on which the floating valve is placed;
   a bottom hole formed in the seat, and communicating the fuel opening with the housing; and
   a flow passage extending from the bottom hole to the evaporator opening, and constricted partially by the seat and a bottom of the floating valve,
   whereby detecting that the fuel tank is filled up with the liquid fuel by increasing a gas pressure within the fuel tank when the level of the liquid fuel within the fuel tank fully closes the fuel opening, and closing the evaporator opening by moving the floating valve upward when the level of the liquid fuel rises abnormally.

7. The apparatus set forth in claim 6, wherein the bottom hole comprises an outer hole disposed outside an area which is demarcated by an image when the floating valve is projected vertically to the seat, and an inner hole disposed inside the area; the inner hole communicates the fuel opening with the housing; a flow passage extends from the inner hole to the evaporator opening, and is constricted partially by the seat and a bottom of the floating valve; and an opening area of the outer hole is greater than an opening area of the inner hole by a factor of 2 or less.

8. The apparatus set forth claim 7, wherein the inner hole is disposed lower and closer to the fuel opening than the outer hole is disposed.

9. The apparatus set forth in claim 6, wherein the floating valve has a receiving surface in a bottom surface thereof, receiving surface which faces the bottom hole.

10. The apparatus set forth in claim 6, wherein the housing further has a cylinder which extends downward and whose bottom-end opening forms the fuel opening.

* * * * *